Patented Jan. 11, 1927.

1,613,894

UNITED STATES PATENT OFFICE.

JOHN J. KESSLER, OF ST. LOUIS, MISSOURI.

PROCESS FOR INDURATING POROUS OBJECTS AND MATERIAL FOR USE IN SAME.

No Drawing.   Application filed August 24, 1925. Serial No. 52,218.

This invention relates to the indurating of porous objects with a new mixture of matter, and has for its object the treatment of porous objects such as wood, stone, concrete, plaster, or paper, or objects containing porous elements such as electrical coils, with a material which can be used in a fluid condition but which can be converted into an infusible, insoluble solid waterproofing and insulating material which fills the porosity of the object and waterproofs, strengthens and hardens it.

This invention makes use of the well known reaction between phenols and aldehydes, but very much simplifies and improves the mehods heretofore in use for polymerization.

In carrying out my invention it is not necessary to first partially polymerize the phenol before using it. I have found that if the phenol is first fluxed with a natural resin such as common rosin, Manila copal, gum shellac, or other natural resins of similar character, these resins serve to act as a vehicle for retaining the phenol. At the same time the natural resin used serves to harden and toughen the ultimate product.

In order to describe further my new composition of matter and process for using same I will state that in previously described processes for untilizing phenol-aldehyde resins, before the final reaction product is brought about by heat, an intermediate product of incompletely polymerized phenol-aldehyde resin is prepared. This intermediate product in whatever condition it is used contains as an essential element the completely or partially soluble phenol-aldehyde resin, which, in the intermediate stage, is also completely or partially fusible.

This intermediate product is finally converted, in situ, into the final or end product.

My process differs from all such processes in that I perform the whole reaction of converting the phenol into the end product in situ.

The natural resin used in my process plays a very important and essential part in the manipulation of the material in that, by the use of it, it is possible to handle the volatile, soft, liquid or low melting point phenolic body with little loss through evaporation.

The natural resin, which readily dissolves the phenolic body, is capable of forming with it a resinous mixture which has many of the mechanical properties of an incompletely polymerized phenol-aldehyde resin. Among these properties may be mentioned the property of solubility, of fusibility, and of having the adhesive and binding qualities of an incompletely polymerized phenol-aldehyde resin.

The natural resin used by me serves therefore to act as a carrier, or vehicle for the free phenol, which retains it and holds it in place until the final stage of the process is carried out, in situ, of converting the free phenol into the polymerized end product. When the final step has been brought about by heating to a temperature sufficiently high to cause a reaction between the phenol and the aldehyde, the natural resin remains in and becomes a part of the finished product, serving to toughen and strengthen it.

The heating of the reaction mixture, besides bringing about a polymerization of the phenol, also brings about more or less polymerization and oxidation of the natural resin used which serves to further toughen and render infusible the finished product.

My process also involves the use of an aldehyde in combination with the natural resin and the free phenol. This aldehyde may be present either in solution or in suspension in the mixture of natural resin and free phenol.

In carrying out the process which I have just described I may use, as an example, a mixture containing thirty parts of Manila gum, seventy parts of phenol, or of cresol, a homologue of phenol, and ten parts of hexamethylenetetramine, a polymerized condensation product of formaldehyde. Such a mixture may be kept fluid at temperatures sufficiently low so that polymerization does not quickly take place and porous objects may be impregnated with it by immersing the object in the mixture.

The process of saturation may be facilitated by carrying it out under pressure.

After the impregnation of the object in the manner which I have described, it is then heated to a temperature sufficiently high to produce a reaction between the phenol and the aldehyde whereby the free phenol is converted into a polymerized phenol resin. Temperatures of from 120° C. to 200° C. are sufficient to bring about such a reaction. The natural resin present serves to retain the phenol while the reaction is going on. At the same time, it adds greatly to the mechanical strength of the polymerized mass on account of its superior toughness.

If I wish to use larger proportions of natural resin and smaller proportions of phenol, as, for instance, a mixture containing seventy parts natural resin and thirty parts phenol together with five parts aldehyde, I may add a volatile solvent such as alcohol or benzol, or whatever solvent is necessary to dissolve the particular type of natural resin used, and in this way I prepare a fluid which may be used at ordinary temperatures or temperatures below the point at which polymerization of the phenol and the aldehyde takes place in the pores of the object to be treated.

I wish to make it clear that the process which I have described is a general one for indurating and insulating porous objects and may be used in a great variety of ways.

It may be used, for instance, to insulate electrical coils and electrical machines.

It may be used for filling the porosity of wood, stone or concrete.

It may be used for preparing sheets of paper that are afterwards pressed together, while being heated for the purpose of forming a composite mass or laminated assembly.

It may also be used for preparing granulated materials useful for moulding purposes.

Wherever the word phenol is used in this specification, ordinary phenol, $C_6H_5OH$, or any of its homologues are referred to, and where I use the word aldehyde, formaldehyde, $CH_2O$, or any of its homologues, or polymerized forms are referred to.

I claim:

1. The process of indurating porous objects which comprises the saturation of the object with a mixture of natural resin, phenol, and an aldehyde, and finally the baking of the object to produce a reaction between the phenol and the aldehyde.

2. The process of indurating porous objects which comprises the saturation of the object with a mixture consisting of a natural resin, a phenol and an aldehyde, all in the form of a varnish, and finally the baking of the object to evaporate the solvent and to complete the reaction between the phenol and the aldehyde.

3. The process of indurating porous objects which comprises the saturation of the object with a mixture of shellac, phenol, and hexamethylenetetramine, and finally the baking of the object to produce a reaction between the phenol and the hexamethylenetetramine.

4. The process of indurating porous objects which comprises the saturation of the object with a varnish containing a natural resin, a phenol and an aldehyde, and finally the baking of the object to produce a reaction between the phenol and the aldehyde.

5. As an article of manufacture, a varnish containing a natural resin, a phenol, and an aldehyde.

6. As an article of manufacture, a composition of matter consisting of a natural resin, a phenol, and an aldehyde.

In testimony that I claim the foregoing I hereunto affix my signature.

JOHN J. KESSLER.